United States Patent [19]
Bloom et al.

[11] 4,315,269
[45] Feb. 9, 1982

[54] THICK PROTECTIVE OVERCOAT LAYER FOR OPTICAL VIDEO DISC

[75] Inventors: Allen Bloom, East Windsor, N.J.; Sidney S. Seffren, Philadephia, Pa.; Alan E. Bell, East Windsor; Robert A. Bartolini, Trenton, both of N.J.

[73] Assignee: RCA Corporation, New York, N.Y.

[21] Appl. No.: 828,815

[22] Filed: Aug. 29, 1977

[51] Int. Cl.³ .................................................. G01D 15/34
[52] U.S. Cl. ........................... 346/135.1; 346/76 L
[58] Field of Search .............................. 346/135, 76 L

[56] References Cited

U.S. PATENT DOCUMENTS

| | | | |
|---|---|---|---|
| 3,560,994 | 2/1971 | Wolff et al. | 346/135 |
| 3,665,483 | 5/1972 | Becker et al. | 346/135 X |
| 3,740,761 | 6/1973 | Fechter | 346/135 |
| 3,889,272 | 6/1975 | Lou et al. | 346/135 X |
| 3,911,444 | 10/1975 | Lou et al. | 346/135 X |
| 3,971,874 | 7/1976 | Ohta et al. | 346/76 L X |
| 4,000,492 | 12/1976 | Willens | 346/135 X |
| 4,023,185 | 5/1977 | Bloom et al. | 346/135 |
| 4,069,487 | 1/1978 | Kasai et al. | 346/76 L |

*Primary Examiner*—George H. Miller, Jr.
*Attorney, Agent, or Firm*—Birgit E. Morris; Allen Bloom

[57] ABSTRACT

An optical recording medium comprises a light reflecting material which is coated with a light absorbing layer and overcoated with a 0.05–1 millimeter thick layer of an optically transparent and chemically and thermally stable material such as a silicone resin. During recording, portions of the light absorbing layer are ablated or melted by a modulated focussed light beam, thereby exposing portions of the reflecting layer while leaving the overcoat layer intact. Information is recorded in the form of a reflective-antireflective pattern. Dust particles and other surface contaminants settle on the upper surface of the overcoat layer, so far removed from the focal plane of the recording lens that their effect on the recording or playback signal is considerably reduced, and no defect is noticeable on the playback monitor.

10 Claims, 4 Drawing Figures

THICK PROTECTIVE OVERCOAT LAYER FOR OPTICAL VIDEO DISC

The U.S. Government has rights in this invention pursuant to Contract No. MDA904-76-C-0429 issued by the Department of the Army.

This invention relates to a novel optical recording medium. More particularly, this invention relates to an optical recording medium overcoated with a transparent protective layer.

BACKGROUND OF THE INVENTION

Spong, in a copending application entitled "Information Record and Related Recording and Playback Apparatus and Methods", U.S. Pat. No. 4,097,895, filed Mar. 19, 1976, and incorporated herein by reference, describes an ablative recording system whereby a focussed modulated light beam, such as a laser beam, is directed at an ablative recording medium. The recording medium comprises a light reflecting material coated with a light absorbing material on a substrate. The thickness of the light absorbing layer is chosen to reduce the reflectivity to a minimum value, so that a maximum of light energy impinging on it is retained therein and is converted to thermal energy. This thermal energy causes the light absorbing material in the area struck by the light to sublime or melt thereby exposing selected portions of the light reflecting layer. During readout, the contrast between the light reflected from the absorbing layer which is at the reflection minimum and the light reflecting layer is detected.

Ongoing work in this area has resulted in the improved performance of materials employed. Thus, in an illustrative embodiment of this recording medium, a substrate which is a flat, smooth non-conductor of heat is coated with a thin layer of a light reflecting material such as aluminum. The aluminum layer is passivated as described in a copending application entitled "Ablative Optical Recording Medium" by Bartolini et al, Ser. No. 668,504, filed Mar. 19, 1976. The passivated aluminum layer is in turn coated with a layer of an organic light absorbing material such as 4-phenylazo-1-naphthylamine as described in Bloom et al, "Ablative Optical Recording Medium", U.S. Pat. No. 4,023,185.

Alternatively, the light reflecting layer is coated with a transparent dielectric material such as silicon dioxide. A thin layer of a metal is coated thereon to serve as the light absorbing layer. This configuration is described in the copending application of Bell entitled "Information Record", Ser. No. 782,032, filed Mar. 28, 1977, now abandoned. Metals which have been used for the light absorbing layer include titanium and Inconel, an alloy of 65–80 weight percent of nickel, 10–30 weight percent of chromium and 0–10 weight percent of iron.

When an organic dye is used as the light absorbing layer, a continuing problem is the mechanical delicacy of the dye layer. A protective coating with good mechanical properties would make it easier to handle the recording medium without damage to the dye layer. Another problem affecting both configurations of the recording medium is the effect of surface dust in causing signal defects or dropouts. When a recording is made on a freshly prepared optical video disc and a playback frame is displayed on a television monitor, fewer than ten signal defects or dropouts are observed. Similar recordings made several days later on the same disc show about 100 defects. The number of defects increases progressively as the disc ages. This is undesirable for commercial applications.

The rising defect count is predominantely due to the accumulation of many small dust particles, most of which are less than 10 microns in size, which precipitate from the environment onto the surface of the disc. As each dust particle moves under the focussed spot of the recording laser beam, it effectively shadows that portion of the track on which it lies, thus preventing the formation of information pits for that segment of the picture signal. On playback the section of recorded track which contained the dust particle exhibits a picture defect or dropout caused by the temporary loss of information. An improved recording medium would make it possible either to remove dust safely or to record without increased defects despite the presence of surface dust.

SUMMARY OF THE INVENTION

We have discovered an improved optical recording medium which comprises a light reflecting material coated with a light absorbing material and overcoated with a relatively thick layer of a solid, transparent, inert material. The upper surface of the overcoat suspends dust particles and other surface contaminants above the focal plane of the recording lens. Thus, the effect of the dust on the playback signal is considerably reduced, with the result that no defect is apparent on the playback monitor.

DETAILED DESCRIPTION OF THE INVENTION

Figure 1:
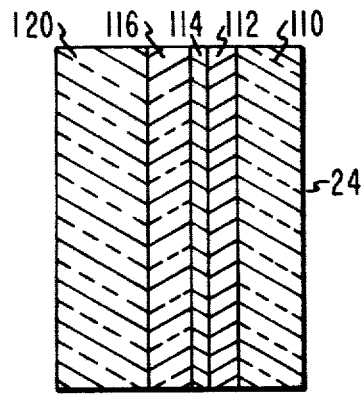
FIG. 1 is a cross-sectional view of a recording medium of the invention prior to recording.

The present invention is directed to a record blank for use with a recording laser beam which provides light of a given frequency. The blank includes a layer of material which reflects light at the laser frequency coated with a layer of material which absorbs light at the laser frequency. Overlying the light absorbing layer is a thick, transparent, inert, protective overcoat layer which suspends surface contaminant particles out of focus of the recording laser beam. If desired, the overcoat layer can be applied after recording, provided the light absorbing layer is kept clean. The light reflecting material can be coated on a substrate with an optically smooth, flat surface to which the subsequently applied light reflective layer is adherent. A glass or plastic plate or disc is suitable.

The reflecting layer should reflect light at the wavelength employed for recording. A gold layer about 800 angstroms thick forms a good, non-reactive reflecting layer. An aluminum layer from about 250 to 500 angstroms thick is also sufficient for this purpose. The aluminum layer can be oxidized to a depth of about 30 angstroms in order to passivate the surface.

The light absorbing layer must be absorbing at the wavelength used for recording. In addition, it should form an amorphous, coherent film of a thickness that minimizes light reflection. Further, the light absorbing layer should be readily ablatable at low temperatures to form clearly defined, regularly shaped holes. A layer of 4-phenylazo-1-naphthylamine, obtained by evaporating the dyestuff Sudan Black B in a vacuum chamber, forms an excellent coating. Another good light absorbing layer is formed by coating the light reflecting layer with a dielectric material which, in turn, is coated with a thin metal light absorbing layer. An Inconel layer about 50 angstroms thick forms an operable light absorbing layer.

Preferably, materials for overcoats according to the invention are optically transparent and non-scattering at the light recording and readout wavelength. Stability to ambient conditions and the ability to take routine handling without degrading are also desired characteristics. A hardness of at least 30 as measured with the Shore A durometer (ASTM Test #D676) and a tensile strength of 45,800 grams per centimeter squared (g/cm$^2$) or greater (ASTM Test #D412) will permit such handling. Increased care in handling must be exercised for materials which fall below these limits. Additionally, a sufficiently low viscosity to permit spin coating is preferred. When the signal is recorded through the overcoat, the overcoat should allow formation of the signal elements beneath it and readout through it without substantially affecting picture quality. Preferably, the overcoat material will be capable of application without physically or chemically disturbing the light absorptive layer. Conversely, a desirable overcoat material will not be chemically, physically or thermally disturbed by the light absorptive layer, either prior to or during recording.

Where otherwise suitable for use as overcoat materials, polymers such as epoxides, polyurethanes, acrylics, polyesters and silicones can be used with recording media using metal light absorbing layers. However, when organic dyes are employed, including 4-phenylazo-1-naphthylamine, their solubility in most common organic solvents renders it difficult to find a low viscosity polymeric system which has suitable characteristics for use as an overcoat material, and which does not dissolve or otherwise react with the dye layer. Silicone resins based on poly(dimethylsiloxane) are able to perform well.

A preferred silicone resin system for the present application is a highly crosslinked polymer formed by mixing a resin having the general formula

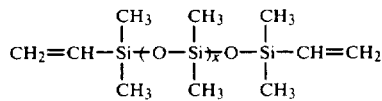  (1)

wherein x is an integer, with a curing agent having the general formula

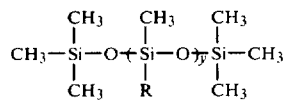  (2)

wherein y is an integer and R can be H or CH$_3$ with the proviso that at least one R is H, in the presence of a platinum catalyst. The cured resin forms an overcoat with the desired properties.

The platinum catalyst normally reacts with any amines present to prevent curing of the silicone resin. When 4-phenylazo-1-naphthylamine dye is used as the light absorbing layer, its reactivity with the uncured silicone can be reduced by heating the dye layer at 40°–50° C. overnight or aging it for several months prior to the application of the silicone resin. Alternatively, a large excess of the curing agent can be used to overcome any inhibition of curing of the silicone resin by the dye. The signal-to-noise ratio of a signal recorded on an overcoated recording medium increases with the length of time the dye layer is stored or baked. The average signal-to-noise ratio is 40–42 decibels for recording media baked at 50° C. for 16 hours after application of the dye layer. Aging or baking the dye layer also prevents it from being removed during spin coating with the silicone.

Another silicone resin system which can be used for the present application has the formula

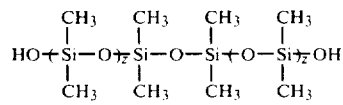

wherein z is an integer. These materials can be formed by the polymerization of a dimethylsiloxane with silanol end groups in the presence of an amine catalyst.

In a preferred embodiment, silicone resin overcoats of the desired thickness can be prepared by spinning uncured silicone resin on a disc previously coated with light reflective and light absorptive layers. The thickness of the overcoat layer can be adjusted easily by standard techniques, such as variations of the spinning speed or the addition of a diluent for the uncured silicone. A low viscosity dimethylsiloxane oil is a commonly used diluent.

The thickness of the overcoat layer determines the distance between the upper surface of the disc and the focal plane of the recording lens. The thicker the overcoat layer, the larger the area which will be described by the light beam from the recording lens as it impinges on the upper surface of the overcoat. Where this area is large compared to the area of any dust particles on the surface, most of the light will bypass the contaminant particles and be focussed on the light absorbing layer, permitting the formation of information pits. Thus, the size of dust particles or other surface contaminants which can be screened out during recording is proportional to the overcoat thickness. For purposes of the present invention, the desired thickness will usually be between 0.05 and 1 millimeter.

The invention will be further explained by reference to the drawings.

FIG. 1 shows a recording medium 24 of the invention prior to exposure to a recording light beam comprising a substrate 110, a light reflecting layer 112 with a transparent passivating layer 114 thereon, a light absorbing layer 116 and an overcoat layer 120 of silicone resin or other suitable material.

Figure 2:
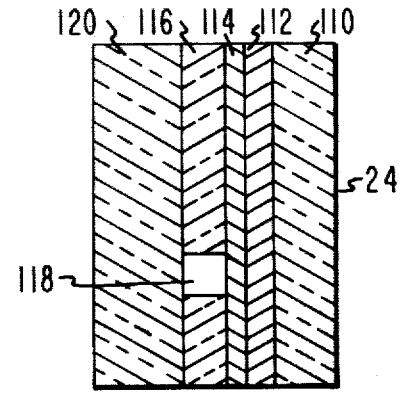
FIG. 2 is a cross-sectional view of a recording medium of the invention after recording.

FIG. 2 shows a recording medium 24 of the invention after exposure to a recording light beam wherein the light absorptive layer 116 has been ablated to leave a pit 118, exposing the passivating layer 114 to light without disturbing the overcoat layer 120. It will be understood that the recording medium after recording contains a plurality of pits 118 rather than the single one shown in FIG. 2.

Figure 3:
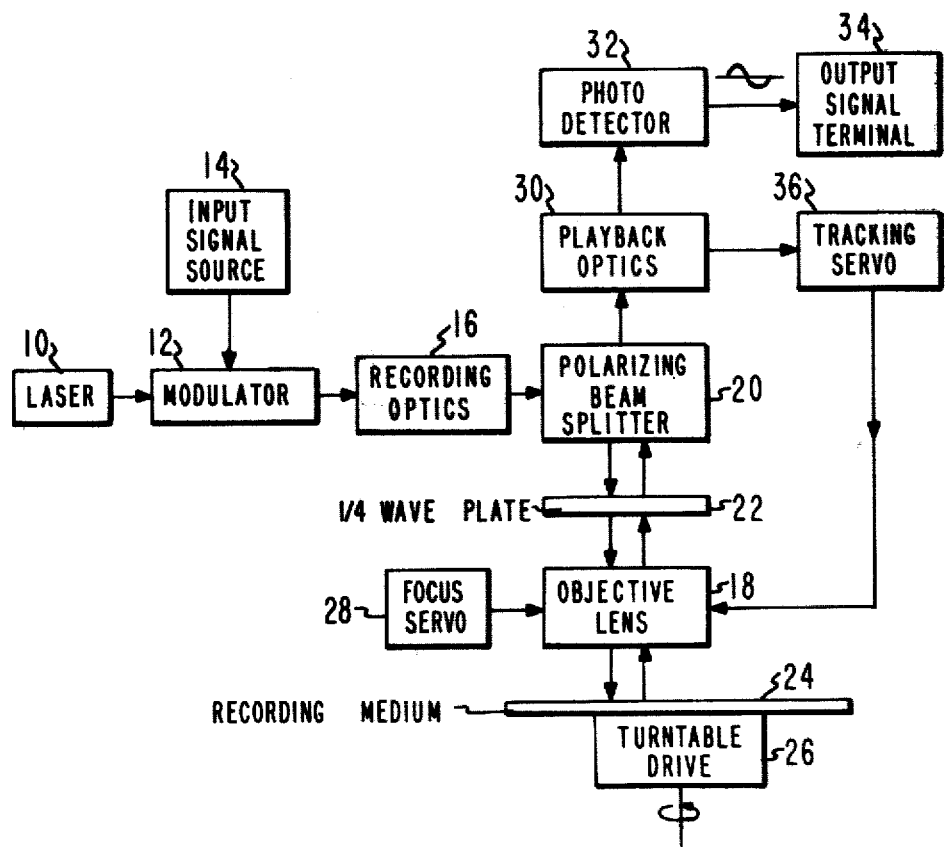
FIG. 3 is a schematic view of a system of recording and playback in which the present recording medium can be employed.

The use of the present recording medium can be explained in greater detail by referring to FIG. 3. For recording, the light emitted by a laser 10 is fed to a modulator 12 which modulates the light in response to an input electrical signal source 14. The modulated light is enlarged by recording optics 16 to increase the diameter of the intensity modulated laser beam so that it will fill the desired aperture of a cover glass corrected objective lens 18. The enlarged modulated laser beam is totally reflected by a polarizing beam splitter 20 and passes through a beam-rotating ¼ wave plate 22 to the objective lens 18. The modulated recording beam then impinges upon a recording medium 24 as described in FIG. 1 and ablates, or melts, a portion of the light absorbing layer to expose a portion of the reflecting layer. The recording medium 24 is rotated by the turntable drive 26 at about 1800 rpm in a spiral track. A focus servo 28 maintains a constant distance between the objective lens 18 and the surface of the recording medium 24.

For readout, an unmodulated and less intense laser beam, that is one that will not cause ablation in the recording medium, follows the same path as the recording beam to the recording medium 24. The recorded reflection-anti-reflection pattern modulates the reflected light back through the objective lens 18 and the ¼ wave plate 22. The light, now rotated by 90° in polarization by the two passages through the ¼ wave plate 22, passes through the polarizing beam splitter 20 and is directed by playback optics 30 to a photodetector 32. The photodetector 32 converts the reflected light beam to an electrical output signal terminal 34 which corresponds to the input signal. A tracking servo 36 monitors the light through the playback optics 30 to ensure that the beam does not wander from the track during playback.

Figure 4:
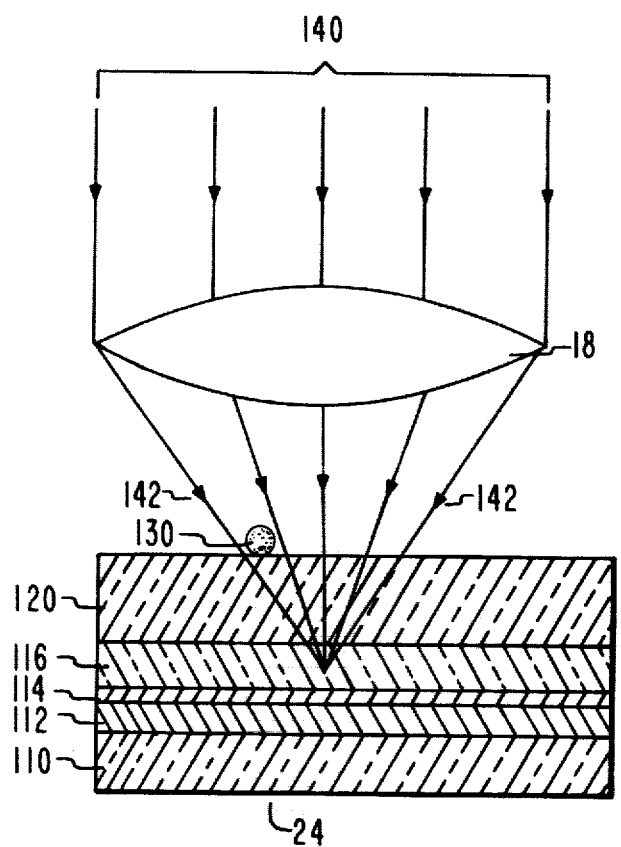
FIG. 4 is a cross-sectional view of a recording medium with a surface dust particle at the inception of recording.

The actual operation of the recording medium to eliminate the effect of surface dust is demonstrated by reference to FIG. 4, which shows the recording medium 24 prior to pit formation. The incident recording light 140 is focussed by the cover glass corrected objective lens 18 on the light absorptive layer 116. Dust particles 130 are suspended on the upper surface of the overcoat layer 120 far above the focal plane of the light. Because of this, most of the focused light 142 will remain unblocked by the dust particles and will be focused on the light absorptive layer, forming a pit through ablation or melting.

The present recording medium can produce high quality recordings with signal-to-noise ratios in the range of 38–46 decibels (dB), with average values of 40–42 dB. Surprisingly, light-induced thermal recording on the organic dye layer through the silicone resin overcoat layer is possible without seriously reducing the signal-to-noise ratio. The above signal-to-noise ratio is within the range of broadcast standards. Recording media with lower signal-to-noise ratios are useful for consumer video disc or digitally encoded information records.

The invention will be further illustrated by the following examples, but the invention is not meant to be limited by the details described therein.

EXAMPLE 1

A glass disc 12 inches (30.5 centimeters) in diameter was coated with a layer of aluminum about 300 angstroms thick. The surface was oxidized to a depth of about 30 angstroms to passivate the metal layer.

A layer of 4-phenylazo-1-naphthylamine about 525 angstroms thick was then formed on the aluminum-coated disc by the evaporation of Sudan Black B dyestuff. In the present example, the dye layer was stored in a dust free atmosphere for 3 months. The dye layer on the disc was then covered with an overcoat layer of silicone resin about 0.08 millimeter thick. The silicone layer was formed by spinning on the disc a mixture of 100 parts of room temperature vulcanizable silicone precursor manufactured by the General Electric Company, GE RTV 615A, which has a viscosity of about 40 poises, 20 parts of General Electric's RTV 910 diluent which has viscosity of about 50 centistokes, and 10 parts of General Electric's RTV 615B, curing agent which has a viscosity of about 20 poises. The silicone rubber coating was cured at room temperature for 24 hours to form a resin as in Formulas (1) and (2). The cured rubber overcoat has a Shore hardness of 35 and a tensile strength of 65,100 g/cm$^2$.

The resultant recording medium was exposed to 50 nanosecond pulses of light having a wavelength of 4880 angstroms at a power level of 250 milliwatts from an argon laser in an apparatus as in FIG. 3. An objective lens without a cover glass correction was used when recording through this overcoat. A high quality television recording was made having a signal-to-noise ratio of 46 dB with fewer than 10 dropouts per image.

A total of ten recordings were made on the disc and the total signal dropouts were noted. Dust particles in sizes from less than 1 micron to 100 microns were applied by blowing the dust above the disc and allowing it to settle. The ten recordings were re-examined and the total number of dropouts was found to have increased by about a factor of 2. The length of the new signal dropouts indicated that they resulted from the larger dust particles from which the 0.08 millimeter overcoat did not provide protection.

EXAMPLE 2

A comparative study between an overcoated recording medium prepared as in Example 1 and a similar but non-overcoated recording medium was conducted by exposing both media to controlled quantities of alumina particles of graded diameters of 5 microns and of 11 microns. The dropout count representing the average number of defects per track for a sample of 25 labelled tracks was noted at the start of the experiment and after each successive dust exposure. For the non-overcoated medium, the 5 micron dusting resulted in an average increase of about 200 defects per track, and the 11 micron dusting resulted in an average increase of 300 defects per track. For the medium with the 0.08 millimeter overcoat, however, there was no significant increase in defect count for the 5 micron dusting and an increase of only 30 defects/track for the 11 micron dusting. Thus, for playback of pre-recorded tracks, a 0.08 millimeter overcoat is sufficient to eliminate video defects due to particles smaller than about 10 microns. Increasing the thickness of the overcoat decreases the number of defects caused by larger particles.

EXAMPLE 3

A glass disc 12 inches (30.5 centimeters) in diameter was coated with a layer of aluminum about 300 angstroms thick. A layer of silicon dioxide about 750 angstroms thick was deposited on the aluminum layer by electron beam deposition. A 50 angstrom thick layer of Inconel, an alloy of nickel and chromium which can contain up to 10 weight percent iron, was deposited on the silicon dioxide layer. The Inconel layer on the disc was then covered with an overcoat layer of GE RTV 615 about 0.08 millimeter thick which was applied as in Example 1. The overcoat was cured at 50° C. overnight.

Recording was carried out as in Example 1 except that the power setting of the laser was varied, and the signal-to-noise ratio was noted. The objective lens did not have a cover glass correction during recording. At low laser power (100–200 milliwatts) the signal-to-noise ratio was not degraded by the presence of the silicone rubber. For example, at 200 milliwatts, the signal to noise ratio was 34 decibels before the overcoat layer was applied and 37 decibels after the overcoat was applied. At higher laser power (300–500 milliwatts), the signal-to-noise ratio is reduced in the presence of the silicone rubber overcoat, implying some damage to the recording medium during recording.

EXAMPLE 4

A gold reflecting layer about 800 angstroms thick was deposited on a glass disc about 12 inches (30.5 centimeters) in diameter. A layer of 4-phenylazo-1-naphthylamine about 400 angstroms thick was applied as in Example 1. The dye layer was overcoated by spinning on a layer of silicone resin about 0.1 millimeter thick. The silicone layer was formed from a mixture of 50.60 grams of Dow Corning's Sylgard 184 resin (Part A) and 6.25 grams of Sylgard 184 curing agent (Part B). Part A has a viscosity of about 50 poises, and Part B has a viscosity of about 20 poises. The sample was allowed to cure at 50° C. for 16 hours to form a silicone resin as in Formulas (1) and (2). The cured overcoat layer had a tensile strength of 63,350 g/cm² and a Shore hardness of 40.

Recording on the resultant medium was carried out as described in Example 1. The recording lens did not have a cover glass correction. The signal-to-noise ratio was 40 decibels.

EXAMPLE 5

A recording medium was prepared as described in Example 4 except that the ratio of curing agent to resin was decreased. The formulation used for the silicone layer was 60.14 grams of the Sylgard 184 resin and 6.10 grams of the curing agent. After 3 days the silicone coating was still tacky. The signal-to-noise ratio of the recorded signals was 35 decibels.

EXAMPLE 6

A recording medium was prepared as in Example 4. The dye layer was overcoated by spinning on a layer of silicone resin formed from a mixture of 49.91 grams of General Electric's RTV 602 resin, 4.90 grams of General Electric's 910 diluent, and 6 drops of General Electric's SRC-05 catalyst. The RTV 602 resin is a dimethylsiloxane with silanol end groups and a viscosity of 12 poises. The SRC-05 catalyst is an amine. To cure the overcoat layer, it was allowed to stand in a clean environment at room temperature for 6 hours and then was baked at 40° C. for 64.5 hours to form a silicone as in Formula (3). The cured overcoat had a Shore hardness of 15 and a tensile strength of 7,040 g/cm². Because the 4-phenylazo-1-naphthylamine dye undergoes a phase transformation at 65° C. it was not possible to bake the overcoat at 95° C., which removes the residual water and amine and improves the overcoat's resistance to thermal degradation.

Recording on the resultant recording medium was carried out as described in Example 1. There was a cover glass correction on the recording lens. The signal-to-noise ratio was 24 decibels, but there were only about 10 dropouts per image. Thus, this material would be useful for use on digitally encoded information records.

We claim:

1. A record blank for use with a recording laser beam providing light of a given frequency, said blank comprising:
   a layer of material which is reflective of light of said frequency,
   a layer of material which is an organic dye highly absorptive of light of said frequency overlying said light reflective layer, and
   a thick, transparent, inert, protective overcoat comprising a silicone resin between about 0.05 millimeter and 1 millimeter thick overlying said light absorptive layer whereby surface contaminant particles are out of focus of said recording light beam.

2. A blank according to claim 1 wherein said silicone resin is formed by mixing a resin having the formula

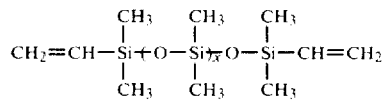

wherein x is an integer, and a curing agent having the formula

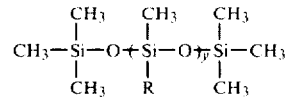

wherein y is an integer and R can be either H or CH$_3$, with the proviso that at least one R is H, in the presence of a platinum catalyst.

3. A blank according to claim 1 wherein said silicone resin has the formula

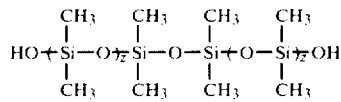

wherein z at each occurrence is an integer.

4. A blank according to claim 1 wherein said light reflective layer is applied to a substrate.

5. A blank according to claim 1 wherein a layer of dielectric material is situate between the light reflecting layer and the light absorbing layer.

6. An information record for use in playback apparatus employing a playback light beam of a given frequency comprising:
   a layer of a material which is reflective of light of said frequency,
   a layer of a material which is an organic dye highly absorptive of light at said frequency over said light reflecting layer, said absorptive layer having therein a succession of spaced pits representative of recorded information; and
   a thick, transparent, inert, protective overcoat comprising a silicone resin between about 0.05 millimeter and 1 millimeter thick overlying said light absorptive layer whereby surface contaminant particles are out of focus of said playback light beam.

7. An information record according to claim 6 wherein said silicone resin is formed by mixing a resin having the formula:

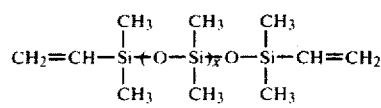

wherein x is an integer, and a curing agent having the formula:

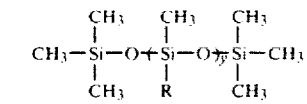

wherein y is an integer and R can be either H or CH$_3$, with the proviso that at least one R is H, in the presence of a platinum catalyst.

8. An information record according to claim 6 wherein said silicone rubber has the formula:

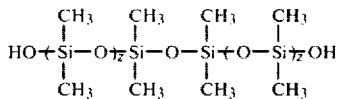

wherein z at each occurrence is an integer.

9. An information record according to claim 6 wherein said layer of light reflective material is applied to a substrate.

10. An information record according to claim 6 wherein a layer of dielectric material is situate between the light reflecting layer and the light absorbing layer.

* * * * *